United States Patent [19]
Mackenzie et al.

[11] Patent Number: 5,493,278
[45] Date of Patent: Feb. 20, 1996

[54] COMMON ALARM SYSTEM FOR A PLURALITY OF CIRCUIT INTERRUPTERS

[75] Inventors: Raymond W. Mackenzie, Baldwin; John A. Wafer, Beaver, both of Pa.

[73] Assignee: Eaton Corporation, Cleveland, Ohio

[21] Appl. No.: 241,225

[22] Filed: May 10, 1994

[51] Int. Cl.⁶ .................................................. G08B 21/00
[52] U.S. Cl. ......................... 340/638; 340/635; 340/639; 335/17
[58] Field of Search .................................... 340/638, 639, 340/635; 335/6, 9, 13, 17, 26, 28; 337/206, 163

[56] References Cited

U.S. PATENT DOCUMENTS

| | | | |
|---|---|---|---|
| 4,081,852 | 3/1978 | Coley et al. | 361/45 |
| 4,134,112 | 1/1979 | Kercheval | 340/632 |
| 4,209,761 | 6/1980 | Klein et al. | 335/17 |
| 4,358,810 | 11/1982 | Wafer et al. | 340/638 |
| 4,706,073 | 11/1987 | Vila Masot | 340/639 |
| 4,752,853 | 6/1988 | Matsko et al. | 361/94 |
| 4,794,356 | 12/1988 | Yun et al. | 335/13 |
| 5,138,299 | 8/1992 | Patten et al. | 340/545 |
| 5,224,006 | 6/1993 | Mackenzie et al. | 361/45 |
| 5,233,330 | 8/1993 | Hase | 340/638 |

*Primary Examiner*—John K. Peng
*Assistant Examiner*—Julie B. Lieu
*Attorney, Agent, or Firm*—Martin J. Moran

[57] ABSTRACT

Apparatus for generating alarms for a group of circuit interrupters, especially those which respond to arcing faults, includes a device associated with each circuit interrupter providing an indication of a tripped condition and a common alarm generator which generates an alarm when any one, or at least any one of a number of selected circuit interrupters, is in the tripped condition. In one embodiment of the invention, switches indicating that associated circuit interrupters are tripped generate auxiliary trip signals on a common alarm bus. The auxiliary trip signals are latched by a latch on the common alarm bus which energizes a relay to activate a local and/or remote alarm. The latch is reset by a switch on the load center door. In another embodiment of the invention, an IR beam is blocked from reaching a photodetector whenever a circuit interrupter handle is in the tripped position which also results in energization of a relay to actuate the common alarm. Selected circuit interrupters only can be alarmed by orienting the light beam such that only circuit interrupters selected by adding an extension to the handle block the beam when the associated circuit interrupter is tripped.

6 Claims, 3 Drawing Sheets

COMMON ALARM SYSTEM FOR A PLURALITY OF CIRCUIT INTERRUPTERS

BACKGROUND OF THE INVENTION

1. Field of the Invention

This invention relates to apparatus for generating a common alarm for all or selected ones of a plurality of circuit interrupters such as would be mounted in a load center. It further relates to apparatus for resetting the common alarm and for providing a distinctive indication should the apparatus remain in the reset condition for an extended period of time.

2. Background of Information

Circuit breakers typically have a handle which, in addition to being used to operate the device, also provides an indication of the state of the device. In some instances, a switch actuated by the circuit breaker is used to provide a remote indication that the circuit breaker has tripped. Recently developed arc-detecting circuit breakers provide an improvement in fire safety by interrupting the current when arcing wiring faults are sensed. As these circuit breakers can not sense wiring faults until after an arc has occurred, there remains some small probability of ignition occurring before the circuit breaker opens. The tripping of the circuit breaker is likely to alert the occupants of the building to the danger, if they are present and awake. However, there is a need for a trip alarm to alert the occupants if they are asleep, or to alert others if the building is unoccupied. Such an alarm does not have to identify the specific circuit breaker which has tripped, but only needs to draw attention to the event. Observation of the handles on the breakers will reveal which one tripped.

SUMMARY OF THE INVENTION

This need and others are satisfied by the invention which is directed to apparatus providing an alarm when any of all or selected ones of a plurality of circuit interrupters goes to a tripped condition. It has particular application to circuit breakers which respond to arcing faults in that it prompts further investigation to assure that no fire was ignited by the fault which caused the trip.

The apparatus includes a plurality of circuit interrupters each having an on condition, an off condition and a tripped condition, and means associated with each circuit interrupter providing an indication that the circuit interrupter is in the tripped condition. If desired, this means can provide a trip indication only in response to an arcing fault. The apparatus further includes common means responsive to the means providing for an indication of the tripped condition for generating a common alarm indication when any, or any of at least selected ones of the plurality of circuit interrupters, is in the tripped condition.

In one embodiment of the invention, the means providing the indication of the tripped condition is the circuit interrupter handle. In this case, the common means for generating the common alarm comprises beam generator means generating a beam of radiant energy and detector means arranged such that the beam of radiant energy impinges on the detector means except when the handle of any of at least the selected ones of the circuit interrupters is in the tripped position, in which case the detector means generates a common trip signal. A common alarm means is actuated by the common trip signal to provide the common alarm indication.

If it is desired that the common alarm be generated only for any one of certain circuit interrupters, those circuit interrupters can be selected by providing them with a handle extension, which is preferably removable, and positioning the beam generator means and the detector means such that the beam of radiant energy is blocked only when the handle of a circuit breaker with an extension is in the tripped position. In order to avoid generation of an alarm when the handle of a circuit interrupter momentarily passes through the tripped position, such as when the circuit interrupter is turned from off to on, or vise versa, a delay may be provided for the detector means so that the common trip signal is not generated until the beam of radiant energy has been blocked for a predetermined time interval.

In accordance with another embodiment of the invention, a switch provides the indication that the associated circuit breaker is in the tripped condition. All of these switches are connected by a common alarm bus to a common trip alarm which is set to an alarm state when any of the switches generates an auxiliary trip signal on the common alarm bus. The common trip alarm means preferably includes latch means which latches any auxiliary trip signal on the common alarm bus, and output means actuated by the latched auxiliary trip signal.

Reset means reset the latch means to deactivate the output means. The reset means can be a switch operated by a door on the enclosure in which the circuit interrupters are mounted. When the door is opened, the latch is reset. If the door remains open for an extended period of time, the reset switch remains activated, thus nullifying the protection provided by the common alarm. To warn of this, warning means provide an indication that the reset switch has been activated for more than a selected time interval. Preferably, the warning means intermittently activates the output means to provide the indication that the door has remained open for more than the selected time interval.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

While the invention is applicable to various types of circuit interrupters, it will be described in detail as applied to the miniature circuit breakers typically provided in residential and light commercial installations. Such circuit breakers have molded housings with the dimensions standardized so that a number of them can be mounted side by side in one or more rows within a standard load center.

Typically, the miniature circuit breaker has a thermomagnetic trip mechanism which responds to line-to-line short circuits and persistent overcurrent conditions by tripping to open the protected circuit. Many of these miniature circuit breakers now also respond to ground faults. An electronic circuit responds to the ground fault by energizing a trip solenoid which activates the thermomagnetic trip device to open the circuit breaker contacts. Such a circuit breaker is described in U.S. Pat. No. 4,081,852 which is hereby incorporated by reference.

Recently, protection has also been provided in such miniature circuit breakers against arcing faults. An example of such a circuit breaker is described in U.S. Pat. No. 5,224,006 which is also incorporated by reference. This circuit breaker includes circuitry which monitors the rate of change of current in the protected circuit to detect arcing faults and energizes the same trip solenoid used by the ground fault trip circuit to trip the circuit breaker in response thereto.

Figure 1:
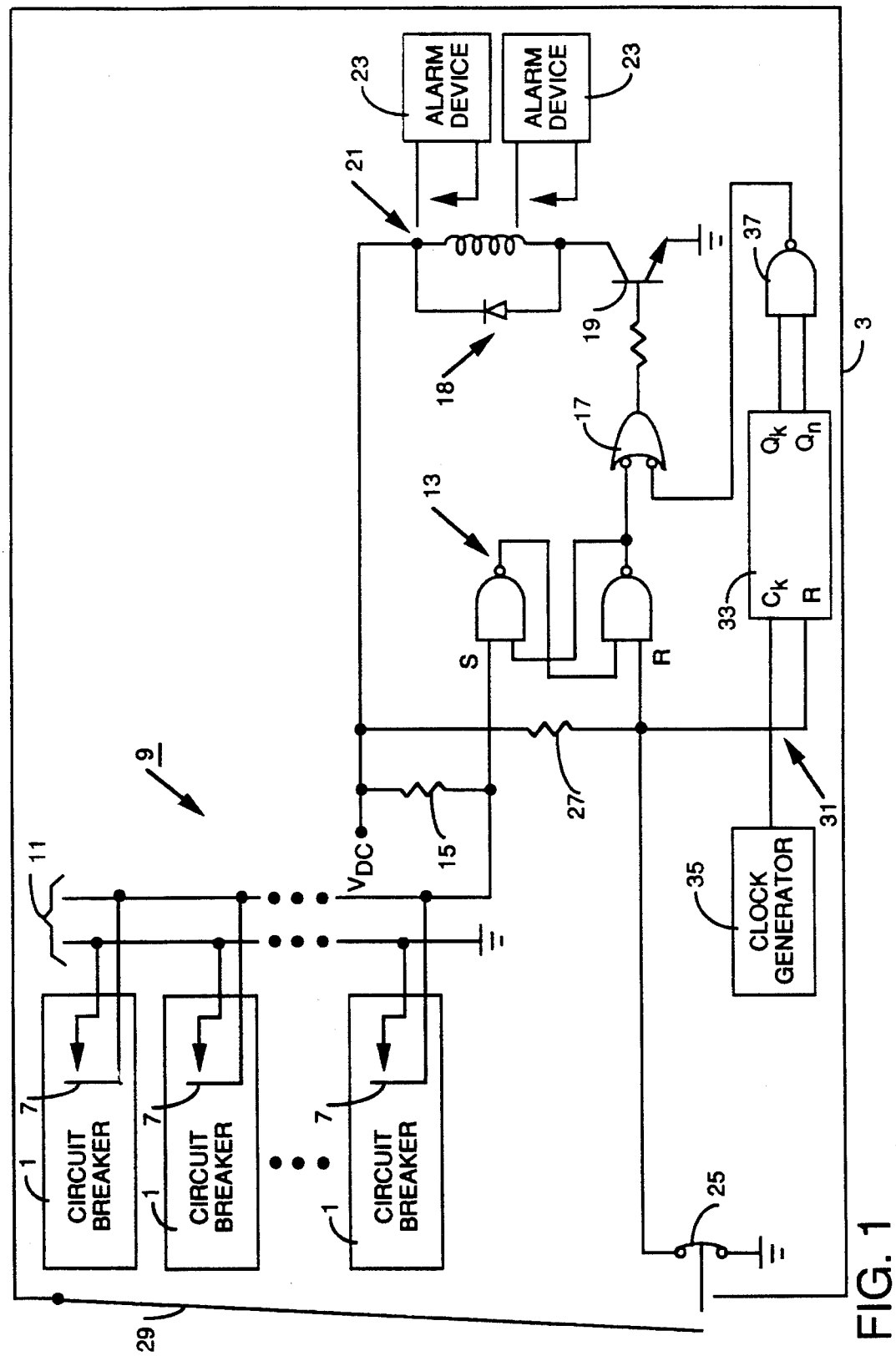
FIG. 1 is a schematic diagram of a multiple circuit interrupter installation incorporating a first embodiment of the invention.

Referring to FIG. 1, a first embodiment of the invention incorporates a plurality of miniature circuit breakers of the type such a shown in U.S. Pat. No. 5,224,006. These circuit breakers are mounted side by side within an enclosure such a load center 3.

Each of the circuit breakers 1 includes a normally open switch 7 which is activated by a trip solenoid (not shown). Preferably, the switches 7 are leaf switches or other such switches having a minimal closing force requirement, imposing minimum loading on the trip solenoid. The trip solenoid is activated by the electronic trip circuits within the circuit breaker 1. These electronic trip circuits can include the arcing fault detection circuit, a ground fault detection circuit, and even an electronic short circuit and overcurrent trip circuit, if provided, in place of a thermomagnetic trip mechanism, all of which are known and not shown on FIG. 1.

All of the switches 7 of the circuit breakers 1 are connected to a common alarm circuit 9 which includes common alarm bus 11. The switches 7 when activated by the associated circuit breakers 1, generate auxiliary trip signals on the common alarm bus 11. The auxiliary trip signals generated on the common alarm bus 11 are latched by a latch comprising an R-S flip-flop 13 formed by a pair of NAND gates. The S input to the flip-flop 13 is connected through a pull-up resistor 15 to a logic level voltage source providing 5 vdc. The common alarm bus 11 is also connected to the S input of the flip-flop 13. When any one of the circuit breakers 1 is in a tripped condition, the associated switch 7 closes momentarily to pull the S input down to ground thereby setting the flip-flop 13 and latching the auxiliary trip signal.

The output of flip-flop 13, which represents a common auxiliary trip signal and goes low when the flip-flop is set, is applied through a negative logic NOR gate 17 of common output means 18 to a transistor 19 which in turn drives a relay 21 in order to operate any number of, and any manner of, alarm devices 23. Such alarm devices can be, for example, light emitting diodes (LED's), buzzers or a computer. The alarm device 23 can be local, or remote and activated through a communications link (not shown) operated by the relay 21. The latter is preferred when the premises are not occupied in order to notify others that a trip has occurred and an investigation should be made, particularly to determine whether the trip was caused by a arcing fault which would require further investigation.

The flip-flop 13 is reset by a reset switch 25 which pulls the R input, connected to the 5 vdc source through resistor 27, down to ground causing the output of the flip-flop to go high, turning off transistor 19 which deenergizes relay 21. Preferably, the reset switch 25 is closed by opening of the door 29 on the load center 3 which provides access to the circuit breakers 1.

Obviously, as long as the door 29 is open, the reset switch 25 remains closed holding the flip-flop 13 in the reset condition. Thus, the protection afforded by the invention is not available as long as the door 29 remains open. In order to make this condition known, a warning circuit 31 is provided. This warning circuit 31 includes a counter 22 which is reset when the reset switch 25 is open, i.e. when the door is closed. When the reset switch 25 is closed, indicating that the door 29 is open, the counter 33 is permitted to count. A relatively low frequency clock signal is provided by the clock generator 35. This clock generator 35 can be a low frequency R-C oscillator or a circuit which squares up the 60 Hz. power line signal. After a selected time interval determined by the number of stages (n) in the counter 33 and the clock frequency, the $Q_n$ output will go high. This $Q_n$ output is NANDed by gate 37 with the $Q_k$ output (k being a fewer number of stages than n), and the resultant signal is applied to a second input of the negative logic NOR gate 17.

The warning circuit 31 provides an intermittent alarm which is easily distinguished from the steady normal alarm. The warning alarm will be turned on and off at a rate determined by the $Q_k$ output. This warning alarm will last for a period of time equal to an initial delay, then will be silent for another identical time period, then will be active again, and so forth.

Figure 3:
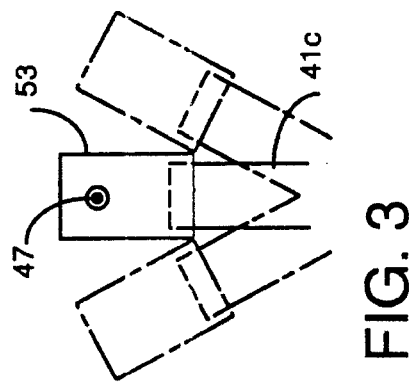
FIG. 3 is a fractional side elevation view of a portion of the installation shown in FIG. 2.
Figure 2:
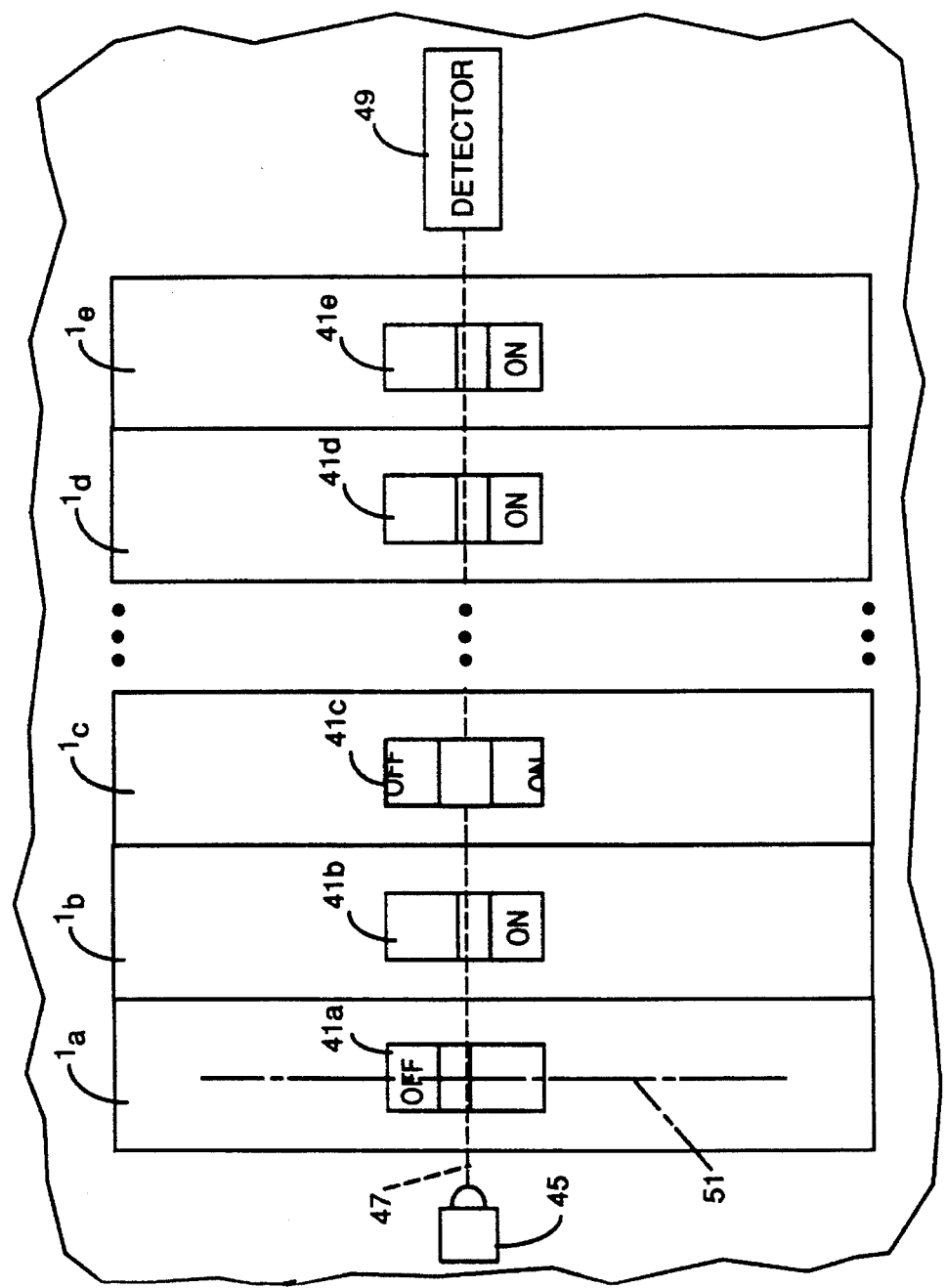
FIG. 2 is a plan view, partially schematic, of a multiple circuit interrupter installation in accordance with a second embodiment of the invention.
Figure 4:
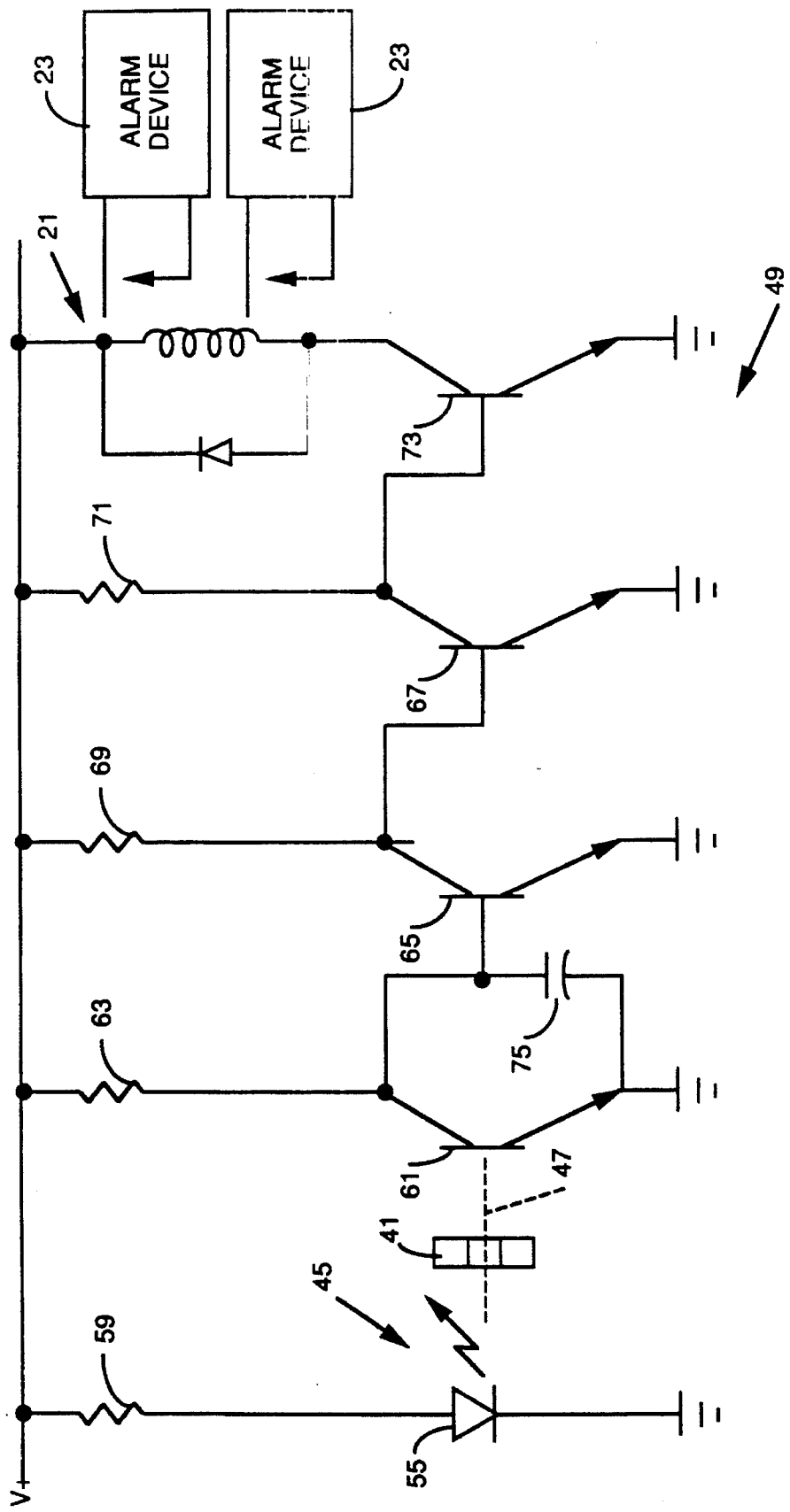
FIG. 4 is a schematic circuit diagram of the embodiment of the invention shown in FIGS. 2 and 3.

Referring now to FIGS. 2 through 4, a second embodiment of the invention uses the handles on the circuit breakers as the indication of the tripped condition of the associated circuit breakers. As seen in FIG. 2, a plurality of circuit breakers $1_a$–$1_e$ are mounted side by side in a panel 39 of a load center 3. Each of these circuit breakers has a handle $41a$–$41_e$. These handles are used to operate the circuit breakers and the position of a handle indicates the operating condition of the associated circuit breaker. Thus, when the handle $41_a$ is in the downward position as shown in FIG. 2, the associated circuit breaker $1_a$ is in the off condition. When the handles are in the up position, as in the case of handles $41_b$, $41_d$, and $41_e$, the associated circuit breakers $1_b$, $1_d$ and $1_e$ are in the on condition. When the associated circuit breaker is in a tripped condition, the handle is centered as shown in FIG. 2 in the case of the handle $41_c$ of the circuit breaker $1_c$. The common alarm device 43 includes a beam generator 45 which generates a collimated beam of radiant energy 47. This beam of radiant energy 47 is directed at a detector unit 49. Preferably, the beam generator 45 includes an IR light emitting diode (LED) as the photodetector used in the detector unit 49 has its best response in this spectral range. The beam generator 45 and detector 49 are positioned on opposite sides of the row of side by side circuit breaker $1_a$–$1_e$ with the beam of radiant energy 47 generally transverse to the planes 51 in which the handles $41_a$–$41_e$ move. With this arrangement, the beam of radiant energy 47 impinges upon the detector 49 except when a handle is in the tripped position, such as the handle $41_c$ as shown in FIG. 2.

FIG. 3 shows the handle $41_c$ in the tripped position midway between the on position shown to the right in phantom line in FIG. 3 and the off position shown in phantom line to the left. FIG. 3 also incorporates a modification which can be used to select circuit breakers for alarming. In accordance with this modification, the IR beam 47 is projected above the normal height of the handle $41_c$ in the tripped position, so that the beam is not affected by operation of the handle 41$_c$. In order to select a circuit breaker for alarming, an extension 53 is slipped onto the handle of each selected circuit breaker. This extension 53 is of such a length, that it blocks the IR beam 47 when the associated circuit breaker is in the tripped condition.

The circuit diagram for the embodiment of the invention at FIGS. 2 and 3 is shown in FIG. 4. The IR LED 55 in the beam generator 45 is energized from a V+bus 57 through a current limiting resistor 59. The detector unit 49 includes a photo-transistor 61 also powered from V+bus 57 through a resistor 63. Three stages of amplification are applied to the signal generated by the photo-transistor 61 by the transistors 65 and 67 powered through resistors 69 and 71, respectively, and transistor 73 which serves as a driver for the relay 21. As in the case of the first embodiment, the relay 21 can actuate any number of output alarm devices 23. No latch is provided in the circuit of FIG. 4, as the handle position will remain until reset. To silence the alarm, the handle can be moved to the off position. The circuit breaker can then remain off until the cause of the trip is identified and corrected.

Delay means may be provided to prevent an alarm when the light beam is interrupted momentarily by manually moving a circuit breaker handle 41 between the on and off positions. One such delay means is a capacitor 75 connected between the collector and the emitter of the photo-transistor 61 as shown in FIG. 4.

The door switch 25 and the timed intermittent alarm 31 may be used with the optical alarm circuit of FIG. 4 to ensure that the load center door 29 is kept closed to prevent ambient light from swamping the photo-transistor 61.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed:

1. Apparatus for generating an alarm when a handle on a circuit interrupter is in a tripped position, said apparatus comprising:

beam generator means generating a beam of radiant energy;

detector means aligned relative to said beam generator means and said handle such that such beam of radiant energy impinges upon said detector means except where said handle is in said tripped position whereupon said detector means generates an auxiliary trip signal;

delay means preventing generation of said auxiliary trip signal when said handle momentarily passes through said tripped position and blocks impingement of said beam of radiant energy on said detector means for less than a predetermined time interval; and output means responsive to said auxiliary trip signal generating an alarm indication.

2. Apparatus comprising:

a plurality of circuit interrupters each having an on condition, an off condition and a tripped condition, and each having an associated means providing an indication of said tripped condition and comprising a handle having an on position when an associated circuit breaker is in said on position, an off position when the associated circuit interrupter is in said off condition, and a tripped position when the associated circuit interrupter is in the tripped condition, said circuit interrupters being arranged with said handles of said plurality of circuit interrupters aligned when in said tripped condition, and selected circuit interrupters only having handle extensions on said handles; and common alarm means providing an indication of the tripped condition only of said selected circuit interrupters, said common alarm means comprising beam generator means generating a beam of radiant energy and detector means responsive to said beam of radiant energy, said beam generator means and detector means being positioned such that said beam of radiant energy impinges on said detector means except when the handle of any of said selected circuit interrupters is in the tripped position and the beam of radiant energy is blocked by a handle extension.

3. The apparatus of claim 2 wherein said handle extensions are removable.

4. The apparatus of claim 2 wherein said detector means includes delay means preventing generation of said common trip signal in response to momentary blocking of said beam of radiant energy from impinging on said detector means when a handle having a handle extension is moved through, but does not remain in said tripped position for more than a predetermined time interval.

5. The apparatus of claim 2 wherein said associated means providing an indication of said tripped condition provides said indication at least in response to a trip caused by an arcing fault.

6. Apparatus comprising:

a plurality of circuit interrupters each having an on condition, an off condition, and a tripped condition, and each having an associated means for providing an indication of said tripped condition comprising a handle having an on position when the associated interrupter is in said on condition, and off position when the associated interrupter is in said off condition, and a tripped position when the associated circuit interrupter is in the tripped condition, and wherein said circuit interrupters are arranged with said handles of said plurality of circuit interrupters aligned when in said tripped condition;

common alarm means responsive to said means providing an indication of said tripped condition associated with each circuit interrupter for generating a common alarm indication when any of at least selected ones of said circuit interrupters is in said tripped condition, said common alarm means comprising beam generator means generating a beam of radiant energy, detector means responsive to said beam of radiant energy, said beam generator means and detector means being positioned such that said beam of radiant energy impinges on said detector means except when any of said handles is in the tripped position, whereupon said detector means generates a common trip signal, common alarm indication means activated by said common trip signal, and delay means preventing generation of said common trip signal in response to momentary blocking of said beam of radiant energy from impinging on said detector means when a handle is moved through, but does not remain in said tripped position for more than a predetermined time interval.

* * * * *